(No Model.) 2 Sheets—Sheet 1.
E. G. N. SALENIUS.
CENTRIFUGAL CREAMER.
No. 556,905. Patented Mar. 24, 1896.
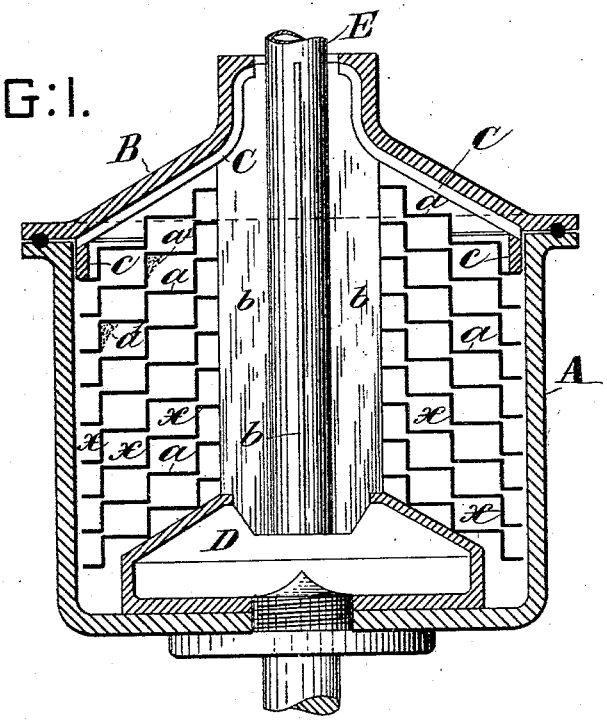
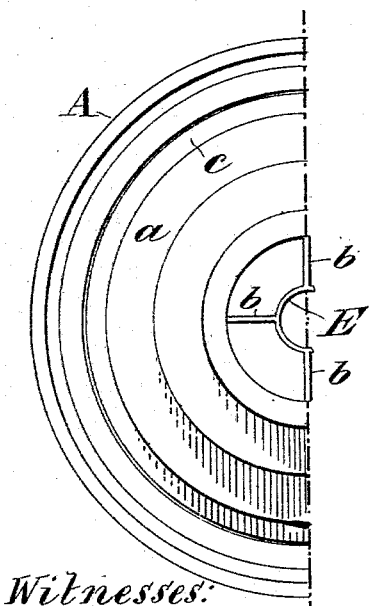

(No Model.) 2 Sheets—Sheet 2.
E. G. N. SALENIUS.
CENTRIFUGAL CREAMER.
No. 556,905. Patented Mar. 24, 1896.
FIG: 3.
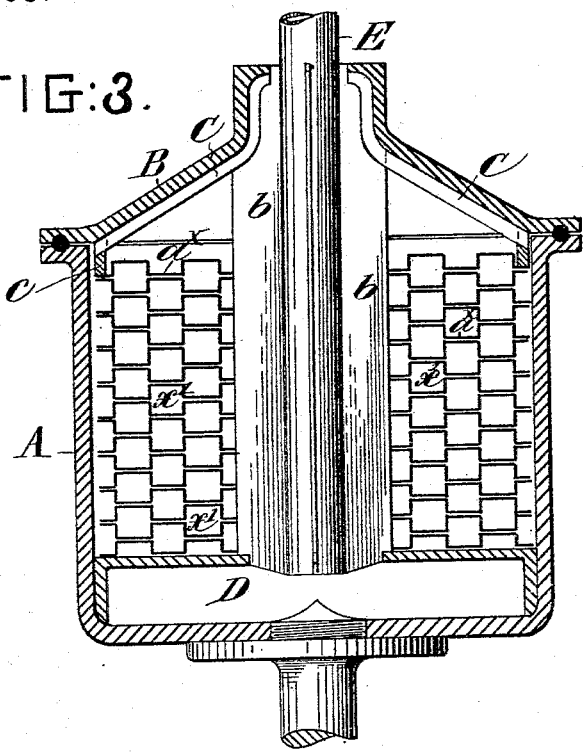
FIG: 4.
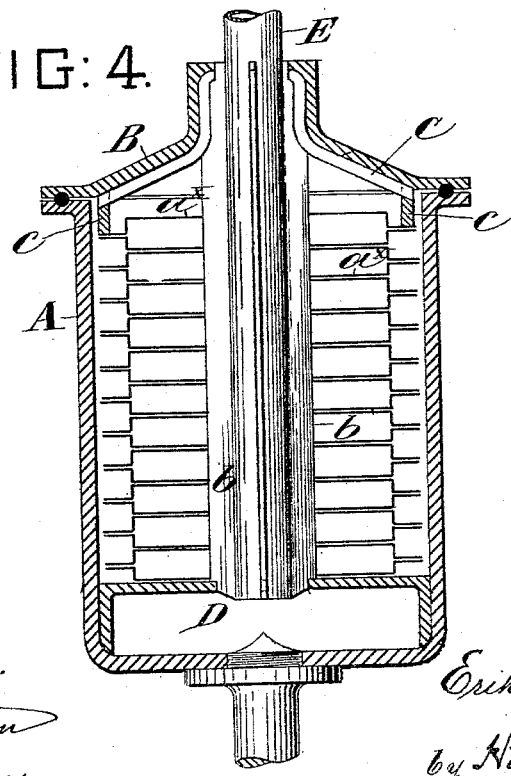
Witnesses:
J. H. Wiman
Peter A. Ross
Inventor:
Erik G. N. Salenius
by Henry Connett
his Attorney

UNITED STATES PATENT OFFICE.

ERIK GUSTAF NICOLAUS SALENIUS, OF STOCKHOLM, SWEDEN, ASSIGNOR TO THE AKTIEBOLAGET RADIATOR, OF SAME PLACE.

CENTRIFUGAL CREAMER.

SPECIFICATION forming part of Letters Patent No. 556,905, dated March 24, 1896.

Application filed June 11, 1894. Serial No. 514,144. (No model.) Patented in France January 30, 1894, No. 235,923, and in England June 5, 1894, No. 10,945.

*To all whom it may concern:*

Be it known that I, ERIK GUSTAF NICOLAUS SALENIUS, a subject of the King of Sweden and Norway, and a resident of Stockholm, Sweden, have invented certain new and useful Improvements in Centrifugal Creamers, (for which patents have been granted to me in Great Britain, No. 10,945, dated June 5, 1894, and in France, No. 235,923, dated January 30, 1894,) of which the following is a specification.

My invention relates to centrifugal apparatus for separating cream from blue milk, and the object of the invention is to supply the drum of the apparatus with removable collectors for the slime which accumulates in centrifugal apparatuses during the process of separation.

Slime and other like matters collect on the inner wall of the drum of a centrifugal apparatus as a deposit from the milk in the process of separation, and unless frequently removed it soon forms a thick layer. This deposit will, as experience has shown, interfere with the proper separation of the blue milk from the cream—that is to say, it reduces the quantity of the blue milk separated and of course leaves too large a percentage of it with the cream, making the latter poorer in butter-fat and less easy to churn. As the layer or deposit of slime increases gradually, the difficulty increases with the length of time the apparatus is used without cleansing. The difficulty may be avoided by preventing the slime from accumulating on the wall of the drum near the skimmed-milk outlets so as to clog the latter and causing it to accumulate on collectors which may be removed from time to time for cleaning. Such collectors form the subject of this application, and are illustrated in the accompanying drawings, wherein—

Figure 1 is a vertical axial section of the drum of a centrifugal apparatus provided with a slime-collector embodying my invention, and Fig. 2 is a plan of one-half of said drum with the cover removed. Figs. 3 and 4 are sectional views similar to Fig. 1, illustrating modified forms of the collectors.

Referring to Figs. 1 and 2, A represents the drum, B its removable cover, and C the outlets thereon for the blue milk. In the bottom of the drum is the receiving-chamber D, into which the milk is fed through a supply or feed pipe E, the milk rising and flowing outwardly over the margin of the opening in the top of the chamber D. The drum contains a set of like superposed ring-plates $a$, of step-like cross-section, the lower plate resting on the inclined top of the chamber D. The pipe E has radial wings $b$, which fill the central apertures in the ring-plates $a$ and form guides for the latter. The ring-plates being all alike, it follows that when the plates are placed one upon another, as in Fig. 1, a series of concentric annular chambers $x$ will be formed thereby. On its passage radially outward under the influence of the centrifugal action the milk passes from chamber to chamber, gradually depositing the slime on the vertical or upright walls of the chambers, somewhat as indicated at $a'$ in some of the chambers. Very little of the slime will reach and accumulate on the wall of the drum. From time to time the plates $a$ must be removed and cleansed, their form offering no obstacle to this. In order to further protect the outlets C for the blue milk from being clogged by the slime a ring-band $c$ may be mounted upon the upper plate $a$, near its outer margin, as seen in Fig. 1. This ring-band should fill the space between the upper plate $a$ and the cover B.

The leading feature of the invention being the providing within the drum of a series of annular compartments arranged in tiers, and those of each tier arranged one exterior, radially, to another, between the axis and the outer wall of the drum, said compartments having each horizontal bottom and top plates or walls and upright walls parallel to the drum-axis, said compartments communicating with each other by way of contracted or narrow slits or openings, so that the liquid is retarded in its outward radial flow and leaves its slime as a deposit on the upright walls, it will be obvious that the construction may vary somewhat so long as it has the above characteristics and the interior devices are adapted to be readily removed for cleansing.

Some slight modifications of the construction are illustrated in Figs. 3 and 4. The former shows a modified form of the ring-plates. Fig. 4 shows another form of superposed ring-plates $a^\times$. Herein each plate has concentric depressions formed in it, and in placing them the plates are inverted alternately, as clearly shown, so that the depressions on adjacent plates come face to face to form compartments or chambers $x'$, arranged concentrically about the drum-axis.

Fig. 4 shows a simplified modification of the construction illustrated in Fig. 3 and will require no special description. In Fig. 3 there are four upright or vertical wall-lines in the plates, while in Fig. 4 there is but one. There may be any number of these, suited to the diameter of the drum.

There may be apertures or openings for the radial flow of the milk and cream other than between the plates, and these may be formed by perforations in the upright walls of the cells, chambers, or compartments formed by the plates. The object is not to arrest the radial flow of the liquids, but to provide obstacles for the currents of liquid to impinge upon and for deflecting the currents. The series of vertical walls at different distances from the drum-axis afford the obstacles, and the step-like arrangement of these walls provides for deflection.

Having thus described my invention, I claim—

1. In a centrifugal separator for milk, the combination with the drum, having an inlet for the milk to be separated and an outlet or outlets for the blue milk, of a removable slime-collector within the drum, said collector comprising a series of annular compartments arranged in tiers and also concentrically in each tier, as described, each of said compartments having walls parallel with the drum-axis and the compartments communicating through narrow or contracted apertures, whereby the flow of the liquid radially outward is checked or retarded and its slime permitted to collect on the upright walls, as set forth.

2. In a centrifugal separator for milk, the combination with the drum, having an inlet for the milk to be separated and an outlet or outlets for the blue milk, of a removable slime-collector within the drum, comprising a series of readily removable, superposed ring-plates bent into the step-like form described, having concentric walls parallel with the drum-axis, whereby annular chambers or compartments are formed, said compartments communicating only through contracted slits or apertures left between the contiguous ring-plates, whereby the flow of the liquid radially outward is deflected and retarded and the slime therefrom permitted to collect on the perpendicular walls, as set forth.

3. In a centrifugal separator for milk, the combination with the drum, having an inlet and outlet for the milk, of a slime-collector within the drum comprising compartments with walls both parallel and perpendicular to the drum-axis, said compartments being, in any given tier, ring-like and concentric with the drum-axis, and said tiers being superposed, each compartment communicating, by means of a contracted slit or aperture, at the lower edge of its front wall with the next outer compartment in the tier below at the upper edge of the rear wall of said lower compartment, substantially as set forth.

In witness whereof I have hereunto signed my name in the presence of two subscribing witnesses.

ERIK GUSTAF NICOLAUS SALENIUS.

Witnesses:
ERNST SVANQVIST,
CARL TH. SUNDHOLM.